(12) United States Patent
Siercks

(10) Patent No.: US 7,911,589 B2
(45) Date of Patent: Mar. 22, 2011

(54) OPTICAL DISTANCE MEASURING METHOD AND CORRESPONDING OPTICAL DISTANCE MEASUREMENT DEVICE

(75) Inventor: Knut Siercks, St. Gallen (CH)

(73) Assignee: Leica Geosystems AG, Heerbrugg (CH)

( * ) Notice: Subject to any disclaimer, the term of this patent is extended or adjusted under 35 U.S.C. 154(b) by 61 days.

(21) Appl. No.: 12/305,709

(22) PCT Filed: Jul. 13, 2007

(86) PCT No.: PCT/EP2007/006226
§ 371 (c)(1),
(2), (4) Date: Dec. 29, 2008

(87) PCT Pub. No.: WO2008/009387
PCT Pub. Date: Jan. 24, 2008

(65) Prior Publication Data
US 2009/0262330 A1    Oct. 22, 2009

(30) Foreign Application Priority Data
Jul. 17, 2006   (EP) .................................... 06117301

(51) Int. Cl.
*G01C 3/08*    (2006.01)
(52) U.S. Cl. ...................................... 356/5.01; 356/5.1
(58) Field of Classification Search ................. 356/4.07, 356/5.01, 5.1
See application file for complete search history.

(56) References Cited

U.S. PATENT DOCUMENTS

| | | | |
|---|---|---|---|
| 6,115,112 A | 9/2000 | Hertzman et al. | |
| 6,493,653 B1 * | 12/2002 | Drinkard et al. | 702/176 |
| 6,522,396 B1 | 2/2003 | Halmos | |
| 7,551,134 B2 * | 6/2009 | Dybdal et al. | 342/362 |
| 7,714,774 B2 * | 5/2010 | Winstead | 342/122 |

FOREIGN PATENT DOCUMENTS

| | | |
|---|---|---|
| WO | 02/45213 A2 | 6/2002 |
| WO | 2005/008271 A2 | 1/2005 |

* cited by examiner

*Primary Examiner* — Isam Alsomiri
(74) *Attorney, Agent, or Firm* — Maschoff Gilmore & Israelsen

(57) ABSTRACT

In order to derive a distance to a target object, in the detection of lower and upper dynamic ranges different detection methods are used simultaneously for the same light signal in an opto-electric distance measuring method having at least one emission of at least one light signal onto a target object and one detection of the light signal scattered back by the target object, wherein the upper dynamic range is recorded by means of a threshold value method and the lower dynamic range is recorded by means of signal scanning for the identification and temporal positioning of the back-scattered light signal.

12 Claims, 4 Drawing Sheets

OPTICAL DISTANCE MEASURING METHOD AND CORRESPONDING OPTICAL DISTANCE MEASUREMENT DEVICE

The invention relates to an electro-optical distance measuring method and to a distance measuring device.

BACKGROUND

In the area of electronic or electro-optical distance measurement, various principles and methods are known. One approach consists in emitting pulsed electromagnetic radiation, such as, for example, laser light, to a target to be surveyed and subsequently receiving an echo from this target as a back-scattering object, the distance to the target to be surveyed being determined on the basis of the transit time of the pulse. Such pulse transit time measuring devices have now become established as standard solutions in many areas.

In general, two different approaches are used for detecting the back-scattered pulse.

In the so-called threshold value method, a light pulse is detected if the intensity of the incident radiation exceeds a certain threshold value. This threshold value prevents noise and interfering signals from the background being incorrectly detected as a useful signal, i.e. as back-scattered light of the emitted pulse. What is problematic, however, is that detection is no longer possible in the case of weak back-scattered pulses, as are produced, for example, by relatively large measured distances, if the pulse intensity falls below the detection threshold. The substantial disadvantage of this threshold value method is therefore that the amplitude of the measured signal must be sufficiently greater than the noise amplitude of optical and electrical noise sources in the signal path, in order sufficiently to minimise incorrect detections.

The other approach is based on the scanning or the sampling of the back-scattered pulse. An emitted signal is detected by sampling the radiation detected by a detector, identifying a signal within the sampled region and finally determining the position thereof. By the use of a multiplicity of sampling values, a useful signal can also be identified under unfavourable circumstances, so that even relatively large distances or background scenarios involving noise or associated with interference can be handled. In the prior art, sampling is effected by scanning many identical pulses with shifting of the time window or of the phase, it currently being possible to realise very fast circuits which have a sufficiently high frequency to sample individual pulses. What is problematic, however, is the knowledge required beforehand about the approximate position, as a function of time, of the signal to be detected, since otherwise the time window as a period to be sampled and hence the data volume may be very large, or alternatively the use of many pulses and time windows to be shifted. However, a prohibitive disadvantage of signal sampling is that no appropriate information about the measured signal which can be evaluated is available in the state of saturated receiving electronics.

U.S. Pat. No. 6,115,112 discloses a measuring method by means of signal sampling, in which the time of arrival of the pulse is established approximately as a function of time by a coarse measurement carried out beforehand. The sampling is then effected as part of a precise measurement for a further light pulse, the limited possible period of arrival of which is now sampled. The measurement is thus divided into a coarse measurement and a precise measurement. The use of this approach inevitably demands a sequence since a time window in which the sampling measurements take place is defined only by the threshold value measurement. Thus, a sequence of coarse measurement and precise measurement on different pulses is effected separately as a function of time.

A substantial disadvantage of measuring principles known to date and based on the pulse transit time principle is therefore either the limitation of signal detection by a detection threshold or the necessity of establishing a time window for the sampling or the saturation of the detector.

Further disadvantages are the requirements regarding the technical components, such as, for example, large dynamic ranges, resulting from the limitation of these influences.

SUMMARY

The object of the present invention is therefore to provide a novel distance measuring method and a novel distance measuring device which avoids or reduces these disadvantages.

In particular, it is an object to increase the dynamic range of a distance measuring device with regard to the measured signal received or to reduce the requirements regarding its components.

The solution is based on the combination of two basic principles for signal detection which are customary in distance measurement. The first of the basic principles already described is based on detection of the measured signal by the threshold value method and the second basic principle is based on signal sampling with downstream signal processing for identification of the signal and determination of the position of the signal as a function of time. In the threshold value method, signal detection is generally defined by the signal amplitude exceeding a threshold value, but the distance-determining signal feature may be very different. Firstly, the ascending flank of the received signal may activate the time trigger, but secondly the received signal can be converted by means of an electronic filter into another suitable form in order to generate a trigger feature which is advantageously independent of the pulse amplitude. The corresponding trigger signal is fed as the start or stop signal to a time measuring circuit.

The two approaches are used simultaneously for signal detection, i.e. a received pulse or a signal structure is detected by both methods, which generally implies simultaneity or at least a time overlap of the methods.

For the method according to the invention comprising the combination of the two principles of threshold value method and signal sampling, it is possible to start from three basic received signal states:

A) The Measured Signal is Smaller than the Noise Level or Possible Interfering Signals.

Here, the threshold value method does not function or functions only to a limited extent since in this case incorrect measurement is triggered by the noise. Here, the sampling method can identify the signal in the noise by mean value calculation over a plurality of signal pulses or laser modulation sequences and signal processing methods. For example, in the case of a known transmitted pulse shape, the signal can be filtered out of the received signal superposed by noise by means of digital signal processing methods. The method according to the invention can therefore also be used in ranges below the detection threshold of pure threshold value methods. The identification method also functions for the case of received signals which are formed from reflection components of a plurality of target objects.

B) The Signal is Greater than the Noise Level but is Still Smaller than the Dynamic Range of the Receiving Electronics.

Both methods can be fully utilised in this range. If the two methods operate in parallel, in particular simultaneously, incorrect detections of the threshold value method can be identified and the threshold value can therefore be lowered so that the range can be increased also in the single pulse measuring mode, i.e. a distance measurement is also carried out for each of the pulses. The joint use of the results of both methods may permit an increase in accuracy. The sampling permits the determination of pulse length and pulse amplitude, from which the pulse energy can be derived. The pulse energy can be used for correcting the dependence of the position of the triggering point of the threshold value method with respect to time. This error is generally designated as "range walk". This can be effected, for example, via a correction table, which replaces a calibration of the system via a reference distance customary in the prior art by variable transmission power. If the non linearity of the receiver limits the accuracy of measurement, this can be supplemented in the case of the use of the threshold value method via the sampling method.

C) The Received Measuring Signal is Greater than the Dynamic Range of the Receiving Electronics.

The threshold value method operates in this range, whereas the sampling method requires only limited information below the saturation limit of the receiving electronics. In the case of a corresponding flank slope of the measured signal, the result of this may be that the accuracy of measurement is then limited by the sampling interval. The signal shape can then no longer be used, or can be used only to a limited extent, in the signal processing. A coarse estimate of the signal energy of the received pulse is, however, still possible and can be used for correcting the errors (range walk) in the distance determination by the threshold value method.

The combination of the two principles therefore permits an extension of the dynamic range and the use of additional information, such as, for example, the pulse energy in the detection of the signal and the derivation of distance information. Since the dynamic range of the receiving circuit should be maximised for electro-optical distance measuring devices in order to be able to cover as many fields of use as possible, this combination of the methods has substantial advantages.

The combination of the methods also permits a simplification of the technical implementation. Since the dynamic range to be covered by the sampling system is reduced in size, substantially lower resolutions of the AD conversion are required, which permits less complexity or lower requirements regarding the components. In operating state A), only a low resolution is likewise required since here the necessary resolution is achieved by mean value calculation in the sense of signal accumulation. The resolution of the AD conversion must be optimised chiefly for operating state B) in association with the sampling rate and the chosen pulse length.

By the combination of the methods, a plurality of pulses can run simultaneously along the measurement distance without ambiguity or assignment problems occurring. These signals are then coded, for example, via the pulse length and can be assigned to the associated transmitted pulse by means of the sampling and corresponding signal processing.

The direct sampling of the sent signal permits reconstruction of the received signal and hence an exact determination of the position of the received signal if the pulse shape of the sent signal is sufficiently known. In the simplest embodiment, for example, the centre of gravity of the pulse is assumed to be the midpoint of the pulse.

The combination, according to the invention, of threshold value method and sampling method can utilise the pulse shape reconstructed by the sampling, in order to correct computationally the errors of the threshold value method which are caused by an asymmetrical pulse or an amplitude variation of the received pulse. The energy of the received signal can be determined by the sampling method and hence the abovementioned so-called range walk of the threshold value method, i.e. the dependence of the trigger time or switching time on the signal power, can be calculated. For example, the information obtained about the pulse energy can be used for controlling an upcircuit electrical or optical attenuator in such a way that the receiving power is kept constant and hence shifting of the trigger point of the threshold value method is corrected in a control loop.

A determination of the pulse position in the frequency range, via the phase determination of selected frequency components, may be advantageous if, through uncorrelated variation of the transmitted pulse shape, the evaluated components of the transmitted pulse spectrum are sufficiently independent thereof.

Moreover, in the range of parallel, simultaneous use of the two approaches, incorrect detections of the threshold value method can be identified and hence the reliability of the measured values can be significantly increased.

Furthermore, incorrect measurements of the scanning method can be detected by the threshold value method or at least the excessive deviation of the measured values of the two methods can be used for identifying incorrect measurements. These errors may be caused by crosstalk in the sensor or by external field influences. The benefit to the probability of error detection is that electromagnetic crosstalk very probably has a different effect on the different realisation of the threshold value method and the sampling method and hence the asymmetry leads to different error influences in the circuits, which in the end can be detected as a deviation.

The joint use of the results of the two methods can likewise permit an increase in accuracy. In this case, a common receiving optical system and a common first amplifier stage are used. The signal is then split and is further processed in an optimised manner for the two methods. The advantage over two or more distance measuring devices operating in parallel is therefore that a simplification is possible by the joint use of the receiving optical system and parts of the receiving electronics. With this use of the same receiving optical system and parts of the receiving electronics, transit time differences due to temperature influences between the signal paths are likewise minimised.

A further advantage is the detection of multiple targets. The sampling method also gives reliable distance values in the case of more than one target object. Even in the case of signal overmodulation, the sampling method may be useable; it can be used as a pre-trigger for the threshold value method. The detection mechanism of the threshold value method is enabled only in the time window of the allocated target object (detect enable).

In the case of an overloaded receiver, the threshold value method can still determine the signal position, while the sampling method does not have sufficient measuring points on the signal flanks for a sufficiently accurate pulse position determination since, in this operating case, the uncertainty of measurement is defined by the sampling interval. Thus, the sampling rate for the sampling method can be kept greater than without the use of the threshold value method.

In view of the apparatus design, the dynamic range to be covered by the AD convertor can be kept small. Moreover, the operation in the case of A) leads to a virtual increase in the resolution of the AD convertor through the averaging associated therewith, if sufficiently uncorrelated noise is superposed on the signal to be sampled. This noise may be caused by the receiving system, the signal source, time-variant transmission properties of the measuring path or background radiation.

A transition from pulse measurement to continuous signals can be realised on the transmitter or source side if the accuracy or the measuring rate is to be increased, for example by a phase measurement method.

BRIEF DESCRIPTION OF THE DRAWINGS

The distance measuring method according to the invention and the distance measuring device according to the invention are described in more detail below, purely by way of example, with reference to working examples shown schematically in the drawing. Specifically.

DETAILED DESCRIPTION

Figure 1:
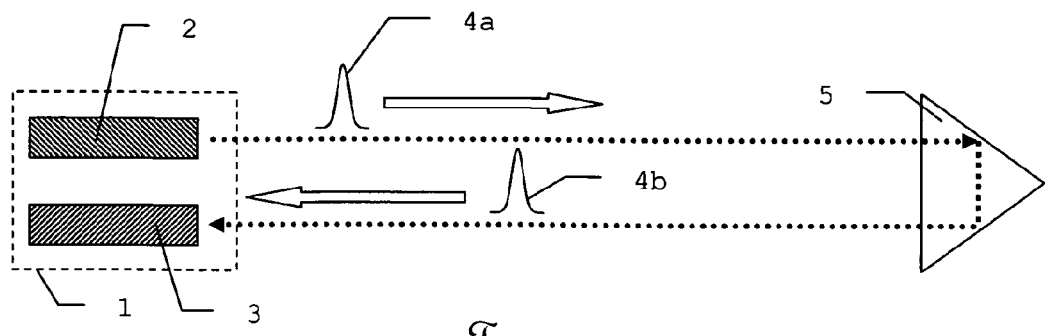
FIG. 1 shows the schematic diagram of an electro-optical distance measuring device according to the prior art.

FIG. 1 shows the schematic diagram of an electro-optical distance measuring device 1 of the prior art according to the pulse transit time principle. A transmitter 2 and a receiver 3 are arranged in the distance measuring device 1. The transmitter 2 emits a light pulse 4a which, after reflection or back scattering by a target, e.g. a retroreflector 5, is detected again as back-scattered light pulse 4b by the receiver 3. Instead of the light pulses, it is also possible according to the invention to use a continuously modulated transmitted signal.

Figure 2:
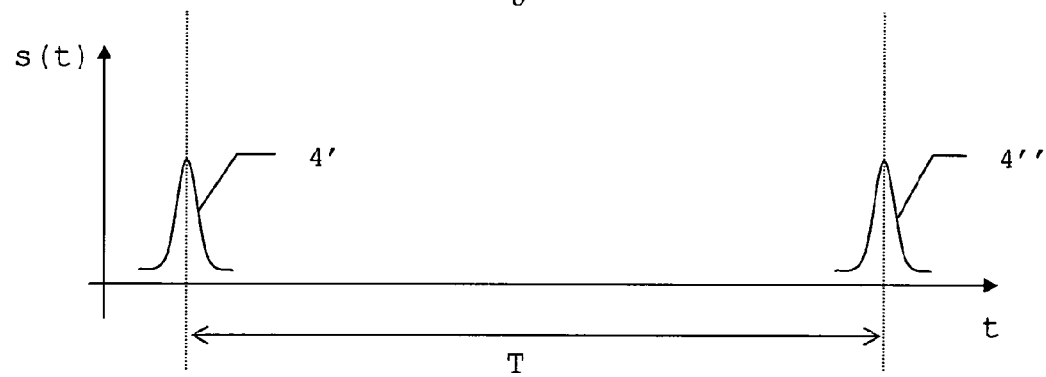
FIG. 2 shows the schematic diagram of a transit time measuring method according to the prior art.

As illustrated in the schematic diagram in FIG. 2, the distance is determined from the transit time T as the time difference between the starting point S of the emission of a light pulse 4' and the receiving time of the back-scattered light pulse 4''. The receiving time is determined by evaluating a feature of the signal pulse s(t), e.g. by exceeding a signal threshold or by determination of the centre of gravity of the integrated pulse curve. As mentioned, in the case of the threshold value method, other methods can also be used for measuring the transmit time T, such as, for example, the conversion of the received signal into a bipolar signal and subsequent determination of the zero transition.

Figure 3:
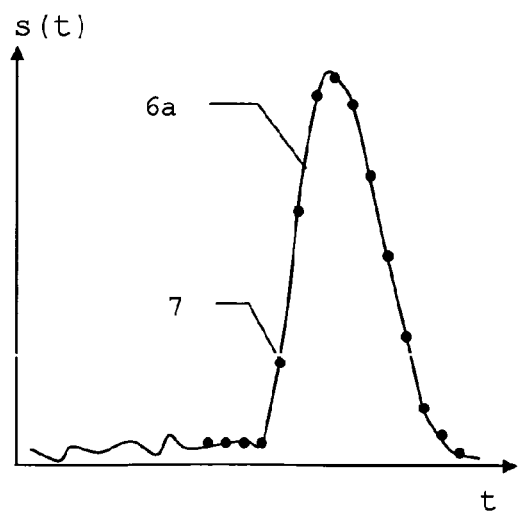
FIG. 3 shows the schematic diagram of a sampling method for back-scattered light signals according to the prior art.
Figure 4:
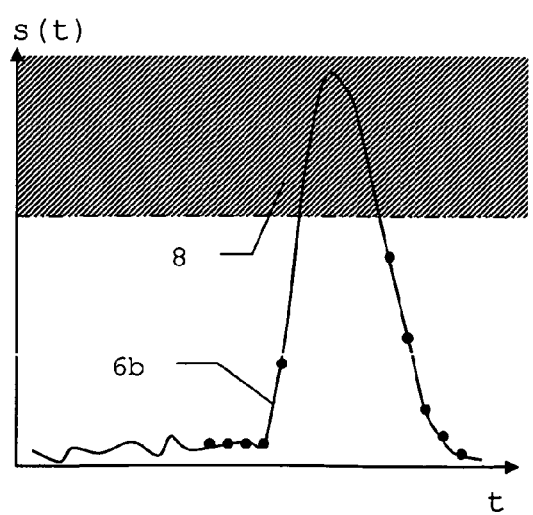
FIG. 4 shows the schematic diagram of the saturation problem of the sampling method.

FIG. 3 illustrates the principle of a sampling method for back-scattered light signals according to the prior art. A received signal 6a or the signal curve thereof is sampled at different times 7 or associated time intervals so that the signal shape can be derived. In order also to be able to detect large variations in the signal pulse s(t), a large dynamic range is required on the receiver side, which dynamic range permits complete detection or sampling of the signal 6a. Otherwise, the situation shown in FIG. 4 may occur if parts of the signal 6b are outside the dynamic range and a saturation problem of the sampling method occurs. Above the saturation limit, there is a saturated range 8 of the receiver in which no meaningfully useable sampling values of the pulse are available. The sampling of the signal 6b is then limited to the range below the saturation limit. Particularly in the case of a steep flank slope, a determination of the signal shape and position is then difficult.

Figure 5:
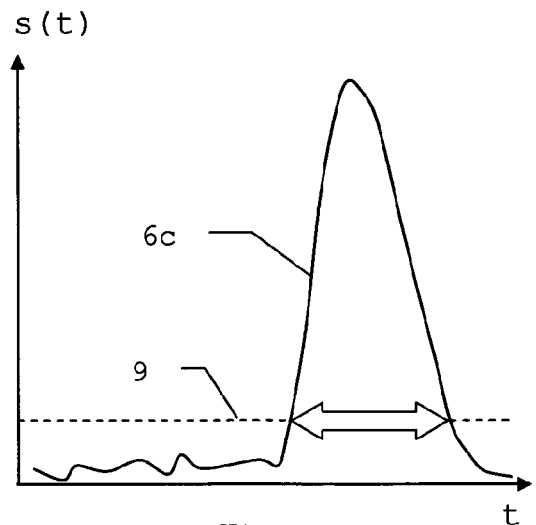
FIG. 5 shows the schematic diagram of a threshold value method for back-scattered light signals according to the prior art.
Figure 6:
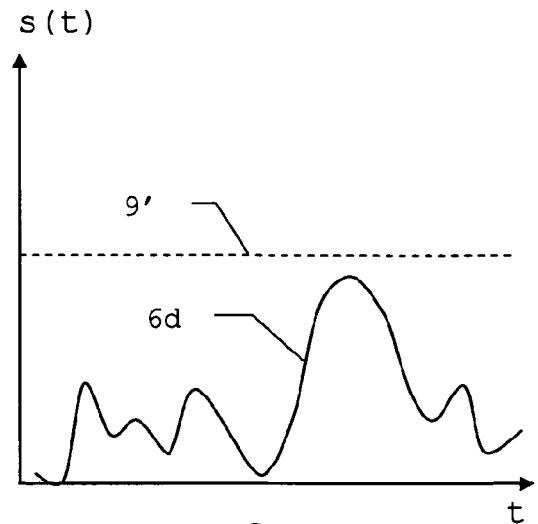
FIG. 6 shows the schematic diagram of the threshold problem of the threshold value method.

FIG. 5 illustrates a threshold value method for back-scattered light signals 6c according to the prior art. In order to suppress noise, background components or systematic interfering signals, such as, for example, due to the optical and electrical crosstalk between transmitter signal path and receiver signal path, and to rule them out from detection, a detection threshold 9 is used. Signal intensities s(t) below this detection threshold 9 do not lead to a response of the receiving unit as a discriminator which generates a stop signal and hence does not lead to detection. If the signal 6c exceeds the detection threshold 9 in its intensity, detection takes place and hence the generation of the stop signal and the registration of the receiving time. The output signal provided by the threshold value method is thus dependent on the received signal or input signal reaching or exceeding the detection threshold 9. If however, as shown in the example of FIG. 6, the signal intensity s(t) always remains below a detection threshold 9', there is no response of the discriminator and the signal 6b is not detected. This threshold problem of the threshold value method occurs, for example, in the case of large measured distances or corresponding background influences, which can drive the necessary threshold level, the threshold signal, upwards.

Figure 7:
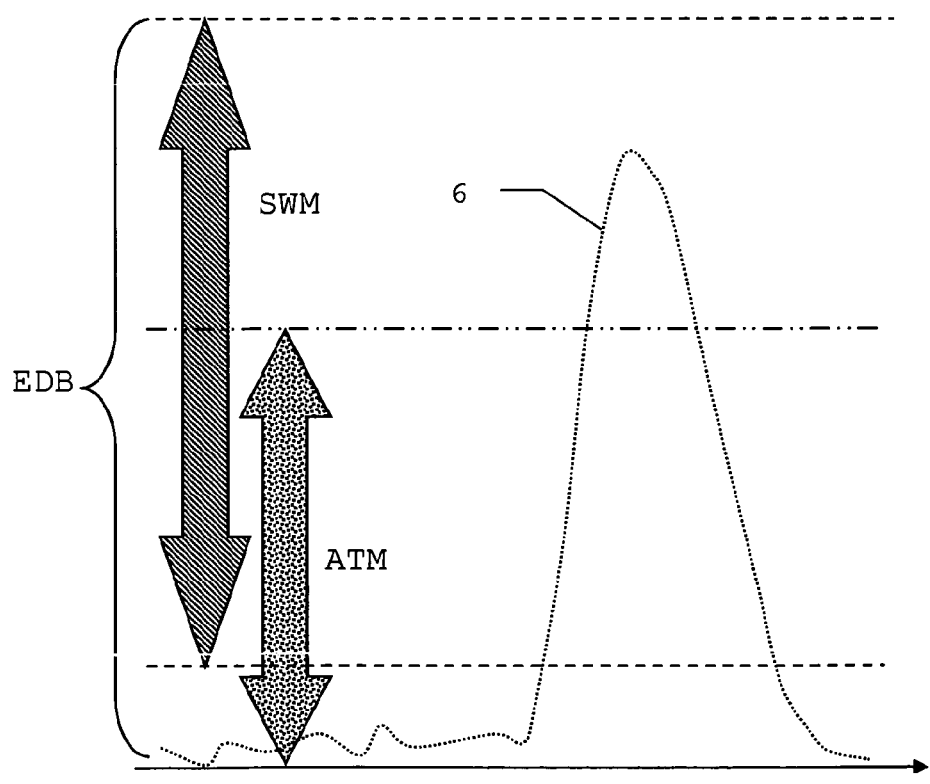
FIG. 7 shows the schematic diagram of the distance measuring method according to the invention.

FIG. 7 shows the distance measuring method according to the invention as a schematic diagram. According to the invention, the principles of the threshold value method SWM and of the sampling method ATM are combined so that a back-scattered signal 6 can be acquired and detected with an extended dynamic range EDB. Parallel to the detection of the light signal 6 scattered back by the target object according to the threshold value method SWM, signal sampling is effected for identifying the back-scattered light signal 6 and for determining the position thereof as a function of time. The dynamic ranges of the threshold value method SWM and of the sampling method ATM overlap to give an extended dynamic range EDB, but ranges simply adjacent to one another can also be realised. Consequently, detection methods differing for a lower and an upper dynamic range are used in parallel, in particular simultaneously, during detection for the same light signal, the upper dynamic range being covered by the threshold value method SWM and the lower dynamic range by signal sampling of the sampling method ATM for identifying the back-scattered light signal and determining the position thereof as a function of time.

For the extreme case of very high signal intensities, the threshold value method SWM can still be used, whereas detection can still be effected by the sampling method ATM in the case of very weak signal intensities and information can be extracted. Particularly in the case of weak signals having a signal/noise ratio of <10, the signal/noise ratio can be increased by means of the sampling method for detected signals by accumulation of well above 1000 pulses and the distance measurement can thus be permitted. In the overlap region of the signal strengths, both principles contribute together to the detection and permit improved signal evaluation.

Figure 8:
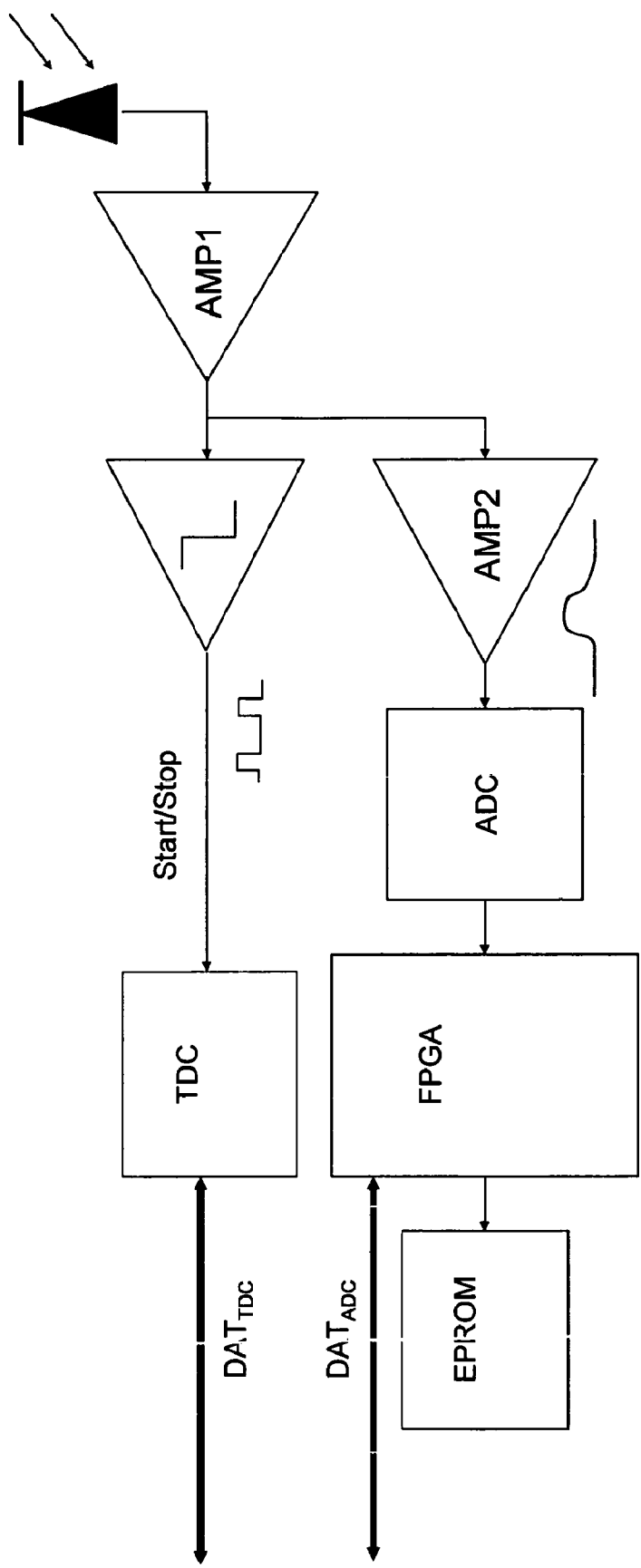
FIG. 8 shows a block diagram of a working example of a receiver of the distance measuring device according to the invention and FIG. 9 shows a block diagram of a working example of the distance measuring device according to the invention.

FIG. 8 shows a block diagram of a working example for a receiver of the distance measuring device according to the invention. The optical signal reflected by the target object is received by means of a photodiode APD and amplified by means of a low-noise broadband amplifier AMP1. The resulting electrical signal is split into two channels and then fed to the combined detection circuit (bottom) and time measurement circuit (top) according to the invention. Firstly, the signal is amplified in as linear a manner as possible by means of an amplifier stage AMP2 and is fed to a fast, signal-resolving analogue/digital convertor circuit ADC with adapted time and amplitude resolution. The sampling data are processed in real time or pipelined in appropriately designed electronics hardware FPGA and stored in a memory EPROM or output. In the case of weak signals, the received signals are accumulated correctly with respect to time for signal emission, so that the signal sampling takes place in a cumulative manner for a plurality of light signals. A direct distance determination or a sufficiently large and appropriately programmed FPGA can also be realised. For example, distance and time mark are output in real time.

Secondly, the output signal of the amplifier AMP1 is fed in parallel to a discriminator. If the received signal is above the threshold value, a trigger unit which generates a start or stop signal from the received signal on the basis of a shaped feature is activated. A down-circuit time measurement circuit TDC digitizes these trigger signals with an accuracy of a few picoseconds.

The time difference t of these signals is then proportional to the distance D to be determined. In the case of a sufficiently well known propagation velocity c of the measured signal and on taking into account systematic errors, for example due to a reference distance, as shown in FIG. 9, the distance D to the measured object can be determined by the elementary relationship $$D = \frac{1}{2} c \cdot t.$$

The sampling values of the time digital convertor TDC and of the analogue/digital convertor circuit ADC are transmitted for further processing via the datalines $DAT_{TDC}$ and $DAT_{ADC}$.

Figure 9:
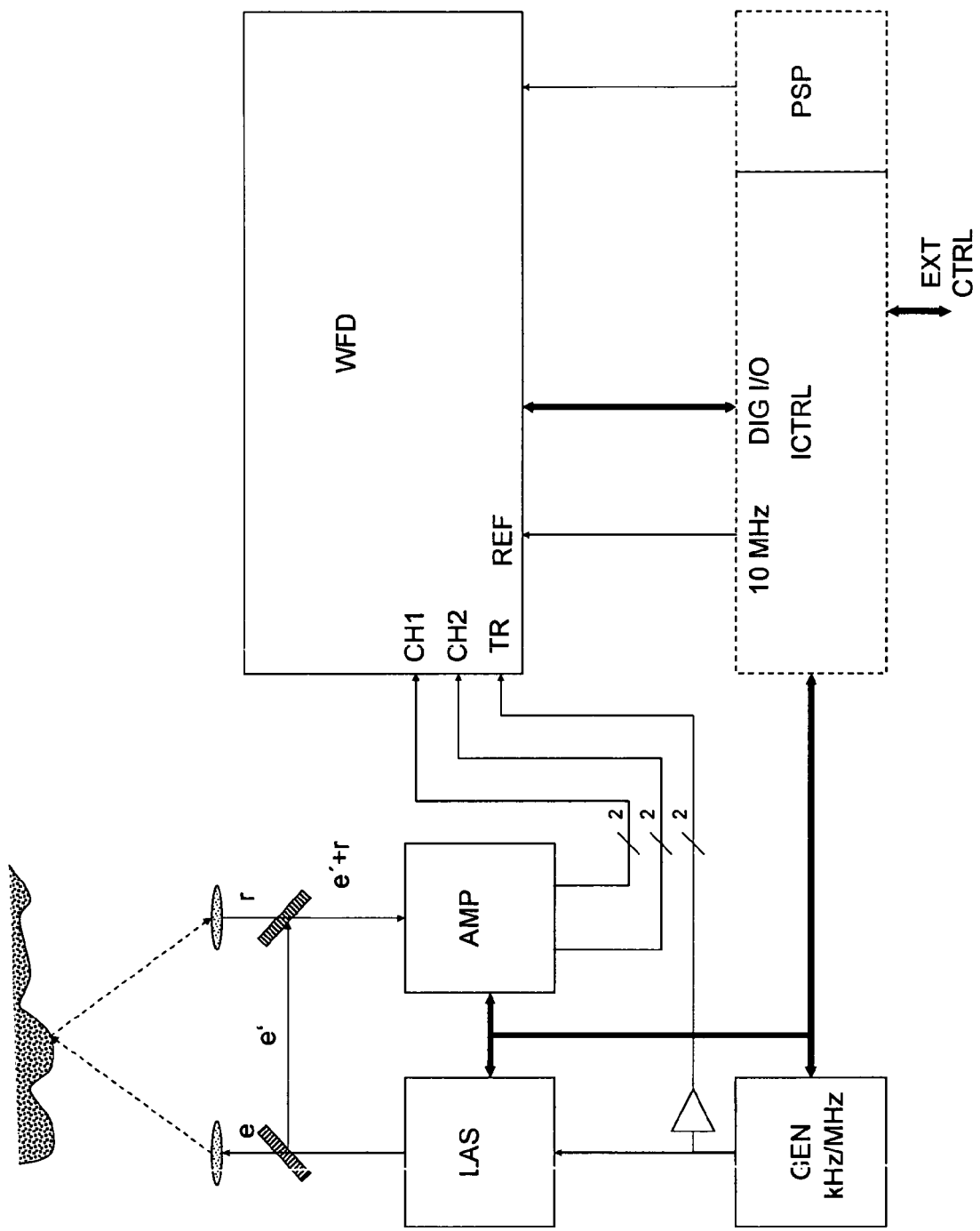

FIG. 9 shows a block diagram of a working example of the distance measuring device according to the invention, the circuit according to the invention being predominantly realised in the modules AMP and WFD explained in FIG. 8. The functional sequences of the distance measuring device with all modules are controlled by a control unit ICTRL with a power supply PSP, the highly resolved sequences as a function of time being defined by a central quartz oscillator having ppm accuracy. A frequency generator GEN generates the corresponding signals which synchronise firstly the opto-electronic transmitter LAS and secondly the modules AMP and WFD. The emitted laser signals pass either serially or simultaneously through an internal light path (e') an external light path (e)+(r). The external light path is directed towards the target object to be surveyed. The internal light path serves in a known manner for calibrating the absolute distance. In the case of simultaneous measurement of the two light paths (e') and (e), the received signal (e'+e) is incident on the receiver AMP. The opto-electronic receiver unit AMP has, for example, the modules AMP1, AMP2 and the discriminator from FIG. 8, the processing unit WFD having the two modules of the time measurement circuits according to the threshold value method and sampling method or scanning method. The receiver thus has a lower and an upper dynamic range, the lower dynamic range being provided by the threshold value-dependent module as a detection unit and the upper dynamic range by the module of the sampling method as a sampling unit. If both time measuring channels are simultaneously active, the optimal distance evaluation method can be selected, for example after determination of the signal strength is complete. In the case of amplitudes of medium signal strength, upper and lower dynamic ranges overlap. In this situation, the two methods can be fully utilised simultaneously because both detection and evaluation methods are active in parallel and the signal information can advantageously be processed in combination.

The two output signals CH1 and CH2 of the receiver unit AMP correspond to the two signals of the distance measuring method according to the invention. The signal CH1 is fed to the distance measuring unit according to the threshold value method and the signal CH2 is acquired by a fast analogue/digital convertor of the coordinated sampling unit. The modules of the distance measuring unit according to the invention with extended dynamic range WFD acquire the time intervals and signal data for at least one target object in the manner described. The results and further data are output via the interfaces of the control unit ICTRL. This control unit ICTRL calculates the final distance and/or takes into account any corrections, such as range walk, temperature or air pressure influences. The data can be output externally via the EXT/CTRL connection.

I claim:

1. A distance measuring method comprising:
   emitting at least one light signal to a target object;
   detecting the light signal scattered back by the target object; and
   deriving a distance to the target object, wherein:
   detection methods differing for a lower and an upper dynamic range are used in parallel simultaneously during detection for the same light signal, the lower dynamic range being below the saturation limit of a sampling unit for signal sampling and the upper dynamic range being above the saturation limit;
   the upper dynamic range is determined by a threshold value method; and
   the lower dynamic range is determined by signal sampling for identifying the back-scattered light signal and determining the position thereof as a function of time.

2. A distance measuring method according to claim 1, wherein the signal sampling is effected cumulatively for a plurality of light signals.

3. A distance measuring method according to claim 1, wherein the light signal is emitted in pulsed form and the derivation is effected by a pulse transit time measuring method.

4. A distance measuring method according to claim 3, wherein, during emission, a sequence of light pulses is emitted and the derivation of at least one distance is effected for each of the light pulses.

5. A distance measuring method according to claim 1, wherein the light signal is emitted with continuous modulation and the derivation is effected by a phase measuring method.

6. A distance measuring method according to claim 1, wherein the amplitude or energy of the back-scattered light signal is determined for calculating the dependence of the switching point of the threshold value method on the amplitude or energy of the back-scattered light signal.

7. An electro-optical distance measuring device comprising:
- a beam source for emission of at least one light signal to a target object;
- a receiver for detection of the light signal scattered back by the target object;
- a threshold value-dependent detection unit;
- a sampling unit for sampling the back-scattered light signal; and
- a control and evaluation component for deriving a distance to the target object, wherein the receiver has a lower and an upper dynamic range, the lower dynamic range being below the saturation limit of the sampling unit and the upper dynamic range being above the saturation limit and the threshold value-dependent detection unit covering the upper dynamic range and the sampling unit covering the lower dynamic range.

8. A distance measuring device according to claim 7, wherein an electrical or optical attenuator upcircuit of the receiver is controlled in such a way that the receiving power is kept constant.

9. A distance measuring device according to claim 7, wherein the signal source is controlled in such a way that the receiving power is kept constant.

10. A distance measuring device according to claim 7, further comprising a receiving optical system and/or amplifier stage common to the threshold value-dependent detection unit and the sampling unit.

11. A distance measuring device according to claim 7, wherein the radiation source is configured to emit a continuously modulated light signal and the control and evaluation component includes a phase measuring device.

12. A distance measuring device according to claim 7, wherein the radiation source is configured to emit a pulsed light signal and the control and evaluation component includes a transit time measuring device.

* * * * *